United States Patent [19]

Fagerburg et al.

[11] 4,155,889

[45] May 22, 1979

[54] PROCESS FOR SUBSTANTIALLY INCREASING THE FLEXIBILITY OF A POLYESTER

[75] Inventors: David R. Fagerburg; Abraham J. Cox, both of Kingsport, Tenn.

[73] Assignee: Eastman Kodak Company, Rochester, N.Y.

[21] Appl. No.: 894,968

[22] Filed: Apr. 10, 1978

[51] Int. Cl.² .............................................. C08G 63/70
[52] U.S. Cl. .............................. 260/22 D; 260/22 T; 264/342 RE; 264/346; 528/272; 528/480; 528/503
[58] Field of Search ................ 260/22 D, 22 M, 22 T, 260/75 T; 264/346, 342 RE; 528/272, 480, 503

[56] References Cited

U.S. PATENT DOCUMENTS

| 2,615,784 | 10/1952 | McClellan | 264/342 RE |
| 3,030,173 | 4/1962 | Kurzke et al. | 264/342 RE |
| 3,275,732 | 9/1966 | Macleod et al. | 264/342 RE |
| 3,330,709 | 7/1967 | Zelnick | 264/342 RE |
| 3,634,580 | 1/1972 | Watase et al. | 264/342 RE |
| 3,669,931 | 6/1972 | Annis et al. | 264/346 |
| 3,739,056 | 6/1973 | Evans et al. | 264/346 |
| 4,045,431 | 8/1977 | Fagerburg | 260/22 D |

FOREIGN PATENT DOCUMENTS 44-15919 7/1969 Japan .............................. 264/342 RE

OTHER PUBLICATIONS

Bjorkstein, Polyesters and Their Applications, Reinhold Publishing Corp., New York, N.Y., 1956, pp. 156, 157, 158, 324, 325, 460, 461, 476 and 477.

Primary Examiner—Ronald W. Griffin
Attorney, Agent, or Firm—William P. Heath, Jr.; Daniel B. Reece, III

[57] ABSTRACT

Disclosed is a process for substantially increasing the flexibility of a polyester by annealing the polyester. The polyester is either a dimer acid or a poly(alkylene oxide)glycol modified poly(1,4-cyclohexylenedimethylene-1,4-cyclohexanedicarboxylate).

3 Claims, No Drawings

PROCESS FOR SUBSTANTIALLY INCREASING THE FLEXIBILITY OF A POLYESTER

This invention relates to a process for substantially increasing the flexibility of a specific type of polyester by annealing the polyester.

Although films of synthetic polymers have been used for many years in a wide variety of applications, in recent years polymer films have enjoyed particular success in packaging applications.

Although polyester films are quite good for general packaging applications, some specific applications require the films to be extremely flexible. One example of a packaging application requiring a film having a high degree of flexibility is baby formula pouches. It has been proposed to prepare baby formula in pouches by forming a tube of a film, then thermoplastically sealing the baby formula in a section of the film tube to form a pouch and then sterilizing the pouch. Because the pouch has been sterilized, the pouch would not need to be refrigerated and could be wholesaled, retailed, and stored by the consumer at ambient temperature. Films used in this packaging application would have to be quite flexible so as not to break.

Another example of a packaging application which would require a film having good flexibility is preparation of precooked food in a so-called "rotortable pouch". The retortable pouch would be constructed of aluminum foil coated with a film. The package would be prepared by forming the aluminum foil around the uncooked food and thermoplastically sealing together the film coated sides of the aluminum foil to form a package for the uncooked food. The package containing the uncooked food would then be cooked and sterilized at 270° F. in a retort. Films for this packaging application would have to be quite flexible so that they could adhere completely to the aluminum foil during coating of the film to the aluminum foil. Films for this packaging application would also have to be quite flexible so that they would not break when the package is prepared by bending the aluminum foil.

I have now invented a process whereby a specific type of polyester can be annealed so that films prepared from the polyester exhibit enhanced flexibility and are suitable for the above packaging applications.

Broadly, the process of my invention comprises annealing the polyester at a temperature of at least 100° C. for a period of at least five minutes. In a preferred embodiment the polyester is annealed at a temperature of at least 120° C. for a period of time of at least 15 minutes.

Although applicant has made no search of the art, applicant is aware of no prior art which shows annealing the specific type of polyester used in applicant's invention. Annealing of polyesters generally is well known in the art. Ser. No. 869,404 filed Jan. 16, 1978, by Fagerburg, Carroll and Moore discloses a process which includes a heating step wherein the dimer acid modified poly(1,4-cyclohexylenedimethylene-1,4-cyclohexanedicarboxylate) useful in this invention is conducted through a heating zone maintained within a temperature range of 55° to 90° C.

The process of this invention is thought to be unobvious over Ser. No. 869,404 because only when the temperature is at least 100° C. and the time is at least 5 minutes is the annealing sufficient to substantially increase the flexibility of the polyester.

The process of this invention is thought to be unobvious over the prior art showing annealing of similar polyesters because annealing substantially increases the flexibility of the specific polyesters of this invention but does not substantially increase the flexibility of very closely related polyesters.

The polyesters useful in this invention are modifications of a poly(1,4-cyclohexylenedimethylene-1,4-cyclohexanedicarboxylate) polyester and are known in the art.

The first polyester can be broadly described as a dimer acid modified poly(1,4-cyclohexylenedimethylene-1,4-cyclohexanedicarboxylate) and is disclosed in U.S. Pat. No. 4,045,431. This polyester is prepared from at least
  (1) a dicarboxylic acid component which is
    (a) from 90 to 60 mole percent 1,4-cyclohexanedicarboxylic acid having a trans isomer content of at least 80 percent, and
    (b) from 10 to 40 mole percent dimer acid, and
  (2) 1,4-cyclohexanedimethanol having a trans isomer content of at least 60 percent.

In a preferred embodiment, the first polyester consists essentially of
  (1) a dicarboxylic acid component which is
    (a) from 85 to 70 mole percent 1,4-cyclohexanedicarboxylic acid having a trans isomer content of at least 90 percent, and
    (b) from 15 to 30 mole percent dimer acid, and
  (2) 1,4-cyclohexanedimethanol having a trans isomer content of at least 60 percent.

The second polyester can be broadly thought of as a poly(alkylene oxide)glycol modified poly(1,4-cyclohexylenedimethylene-1,4-cyclohexanedicarboxylate). This polyester is prepared from at least
  (1) 1,4-cyclohexanedicarboxylic acid having a trans isomer content of at least 80 percent,
  (2) a diol component comprised of
    (a) 1,4-cyclohexanedimethanol,
    (b) from 20 to 50 weight percent, based on the weight of the polyester, of a poly(alkylene oxide)glycol having 2, 3 or 4 carbon atoms in the repeating unit and having a molecular weight in the range of 600 to 4,000.

The 1,4-cyclohexanedicarboxylic acid useful in this invention can exist as both a trans and cis isomer. In this invention, the 1,4-cyclohexanedicarboxylic acid used to prepare the polyester of this invention must have a trans isomer content of at least 80 percent, preferably at least 90 percent. If the trans isomer content of the starting dicarboxylic acid is below about 80 percent the time for the polymer to crystallize from the melt tends to become commercially unacceptable. Also the melting point tends to drop to an unacceptable level.

The dimer acid useful in the first polyester can be described as a 36 carbon atom, long chain aliphatic dicarboxylic acid. The preparation and structure of the dimer acids are described in *Journal of American Oil Chemists Society*, 39, 534–545 (1962). It is generally prepared by dimerizing an unsaturated fatty acid contining 18 carbon atoms such as linoleic or linolenic acid or a monohydric alcohol ester thereof. It is recognized in the art the dimer acids are chemicals of unique properties. Several different grades of dimer acids are available commercially which vary in monomer and trimer content and iodine value. For example, dimer acid is available from Emery Industries, Inc., under the tradename Empol Dimer Acid. Preferably, the dimer acid used in this invention is substantially free of monomer and trimer fractions, which can be accomplished by distillation. Preferably, the dimer acid content is at least 95%. The dimer acid may be used in its hydrogenated or unhydrogenated form.

It will be understood the term "dicarboxylic acid" is meant to include functional equivalents of dicarboxylic acids, such as dialkyl esters.

The 1,4-cyclohexanedimethanol useful in this invention can also exist as a mixture of cis and trans isomers. In this invention the 1,4-cyclohexanedimethanol has a tran isomer content of at least 60 percent. If the trans isomer content is lower than about 60 percent the time for the polymer to crystallize from the melt tends to become commercially unacceptable. Also the melting point tends to drop to an unacceptable level.

The poly(alkylene oxide)glycol useful in the second polyester can be described as a poly(alkylene oxide)glycol having 2, 3 or 4 carbon atoms in the repeating unit and having a molecular weight in the range of 600 to 4,000. Examples of poly(alkylene oxide)glycols that can be used include poly(ethylene oxide)glycol, poly(propylene oxide)glycol and poly(tetramethylene oxide)glycol. These glycols are well known in the art and are disclosed in Defensive Publication T878,004, of Sept. 8, 1970, entitled "Poly(tetramethylene Glycol) Having a Narrow Molecular Weight Distribution and Its Manufacture", by Seaton et al.

Optionally, the second polyester can contain small quantities, perhaps up to about 25 mole percent of the diol portion, of other glycols such as ethylene glycol, trimethylene glycol, tetramethylene glycol or 2,2-dimethyl-1,3-trimethylene glycol.

The polyesters useful in this invention can be either a random polymer or a blocked polymer. The blocked polymer is preferred because the increase in flexibility is greater when the blocked form of the polymer is used.

The first polyester useful in this invention can be prepared in the form of a random polymer by methods for preparing high molecular weight polyesters well known in the art, such as direct condensation or ester interchange. Preferably the polyester is prepared by a combination of esterification and ester interchange where the dimethyl ester of 1,4-cyclohexanedicarboxylic acid and the dimer acid component are reacted with the 1,4-cyclohexanedimethanol to form a mixture of the bis ester of 1,4-cyclohexanedicarboxylic acid and the bis ester of the dimer acid and then the mixture of bis esters is polycondensed at high temperature and low pressure to form a high molecular weight polymer through elimination of 1,4-cyclohexanedimethanol.

The first polyester useful in this invention can be prepared in the form of a blocked polymer by a technique known in the art whereby a low molecular weight polyester of 1,4-cyclohexanedicarboxylic acid and 1,4-cyclohexanedimethanol is melt blended with a low molecular weight polymer of dimer acid and 1,4-cyclohexanedimethanol under polycondensation conditions of high temperature and low pressure until a high molecular weight polymer is formed.

The second polyester useful in this invention is well known in the art and can be prepared in the form of a random polymer by methods well known in the art for preparing high molecular weight polyesters. Preferably the polyester is prepared by ester interchange whereby the dimethyl ester of 1,4-cyclohexanedicarboxylatic acid is ester interchanged with 1,4-cyclohexanedimethanol and the poly(alkylene oxide)glycol under the influence of heat and the resulting bis esters are polycondensed at high temperature and low pressure to form a high molecular weight polymer.

The second polyester can be prepared in the form of a blocked polymer by techniques known in the art whereby a low molecular weight polyester of 1,4-cyclohexanedicarboxylic acid and 1,4-cyclohexanedimethanol is melt blended with a low molecular weight polyester of 1,4-cyclohexanedicarboxylic acid and the poly(alkylene oxide)glycol under polycondensation conditions of high temperature and low pressure until a high molecular weight polymer is formed.

The polyesters useful in this invention have an inherent viscosity of at least 0.6, and preferably at least 0.7, measured at 25° C. using 0.23 grams of polymer per 100 ml. of a solvent composed of 60 volumes of phenol and 40 volumes of tetrachloroethane.

The polyester can be annealed by exposing the polyester to a heating zone in the final physical form in which the polyester is to be used. Although the heating zone can comprise a great many means for achieving the required heating, such as radiant electric heaters, heat lamps or a hot air oven, preferably the heating zone comprises a circulating hot air oven.

The process of this invention has been described as substantially increasing the flexibility of the polyester. By the term "substantially increasing the flexibility", "substantially increased flexibility" and words of similar import we mean that the film modulus, determined in accordance with ASTM D882, of a film of the polyester is at least 20 percent, preferably at least 25 percent, lower than the film modulus of an unannealed film of the same polymer.

The polyester that is annealed in this process must be in its final physical form prior to annealing because subsequent forming operations such as extrusion into film, molding into useful articles and the like, cause the flexibility of the processed article to return to substantially its original flexibility. Thus, if it is desired to use the polyester in the form of films, the annealing process must be conducted on the films and not on the pellets used to extrude the films.

The polyester useful in the process of this invention can be prepared into films and molded articles by techniques well known in the art such as hot rolling, extrusion or injection molding. Preferably, films are prepared by extrusion using commercial equipment well known in the art. In a typical process pellets of the polyester are melted and conducted through an extruder and extruded in the form of a molten film which is rapidly cooled so that the polyester solidifies and the film is then taken up on rolls.

The following examples are presented to illustrate preparation of polyesters useful in this invention, to illustrate preparation of films from the polyesters of this invention, to illustrate the annealing process of this invention, and to document that annealed films of the polyester of this invention exhibit enhanced flexibility.

RANDOM POLYMER

A random polyester of the invention is prepared from 80 mole percent 1,4-cyclohexanedicarboxylic acid with 100 percent trans isomer content, 20 mole percent dimer acid, and 1,4-cyclohexanedimethanol.

Into a reaction flask equipped with a stirrer, nitrogen inlet, and outlet for volatile materials produced during the reaction is weighed the following: 80.0 g. (0.40 mole) of dimethyl-1,4-cyclohexanedicarboxylate, 100 percent trans isomer, 56.6 g. (0.10 mole) of Empol 1010 dimer acid, commercially available from Emery Industries, Inc., 124 g. (0.60 mole, 20% excess) of a 70% solution in methanol of 1,4-cyclohexanedimethanol, 70% trans isomer, and 150 ppm. Ti metal as titanium tetraisopropoxide in n-butanol. The mixture is stirred under nitrogen and immersed in a metal bath held at 200° C. After 15 minutes of stirring, the bath temperature is raised to 225° C., held there for approximately 20 minutes, and raised to 290° C. Upon reaching 290° C., a vacuum is applied to a final pressure of 0.1 torr. The reaction is polycondensed for 3 hours 15 minutes after which time the apparatus is repressurized with nitrogen and the polymer allowed to cool. The inherent viscosity of the polymer is 0.81.

A film is prepared by extrusion of the molten polyester. A portion of this film is annealed in accordance with the process of the invention by placing the film in a hot air circulating oven for 1 hour at 120° C. and exhibits a flexural modulus of 10,500 psi. The remaining portion of the film was not annealed and exhibited a flexural modulus of 14,200 psi.

BLOCKED POLYMER

A blocked polyester of the invention is prepared from 80 mole percent 1,4-cyclohexanedicarboxylic acid with 100 percent trans isomer content, 20 mole percent dimer acid, and 1,4-cyclohexanedimethanol.

Into a reaction flask equipment with a stirrer, nitrogen inlet, and outlet for volatile materials produced during the reaction is weighed the following: 64.0 g. (0.320 mole) of dimethyl-1,4-cyclohexanedicarboxylate, 100 percent trans isomer, 82 g (0.40 mol) of a 70% solution of 1,4-cyclohexanedimethanol in methanol, and enough titanium tetraisopropoxide to give 150 ppm of titanium metal based on the final weight of the blocked polymer. The mixture is stirred under nitrogen at 200° C. for one hour and the temperature raised to 290° C. The vacuum is then applied to a final pressure of 0.1 torr. After one hour of polycondensation, the flask is repressurized with nitrogen, 54.4 g (0.08 mol) of a polyester of dimer acid and 1,4-cyclohexanedimethanol having an inherent viscosity of 0.4 is added and the polymer stirred for 10 minutes following which vacuum is reapplied and polycondensation continued for an additional two hours and 20 minutes. The blocked polymer is cooled under nitrogen and has an inherent viscosity of 0.75.

A film is prepared by extrusion of the molten polyester. A portion of this film is annealed in accordance with the process of the invention by placing the film in a hot air circulating oven for 1 hour at 120° C. and exhibits a flexural modulus of 8,000 psi. The remaining portion of the film was not annealed and exhibited a flexural modulus of 12,000 psi.

Films of closely related random or blocked polyesters do not show a substantial increase in flexibility upon annealing. For example, if the 1,4-cyclohexanedicarboxylic acid is replaced with terephthalic acid the polyester does not show a substantial increase in flexibility upon annealing. Also for example, when the 1,4-cyclohexanedimethanol is replaced with ethylene glycol, butanediol or other similar glycols the substantial increase in flexibility is not observed.

The invention has been described in detail with particular reference to certain preferred embodiments thereof, but it will be understood that variations and modifications can be effected within the spirit and scope of the invention. Specifically, in certain circumstances the times and temperatures used for annealing might be modified somewhat in certain peculiar situations. Also, in some circumstances the composition of the polymer might be changed to some extent.

I claim:

1. A process for substantially increasing the flexibility of a polyester in its final physical form comprising annealing at a temperature of at least 100° C. for a period of at least 5 minutes
    (A) a first polyester having an inherent viscosity of at least 0.6 prepared from at least
        (1) a dicarboxylic acid component which is
            (a) from 90 to 60 mole percent 1,4-cyclohexanedicarboxylic acid having a trans isomer content of at least 80 percent, and
            (b) from 10 to 40 mole percent dimer acid, and
        (2) 1,4-cyclohexanedimethanol having a trans isomer content of at least 60 percent, or
    (B) a second polyester having an inherent viscosity of at least 0.6 prepared from at least
        (1) 1,4-cyclohexanedicarboxylic acid having a trans isomer content of at least 80 percent,
        (2) a diol cmponent comprised of
            (a) 1,4-cyclohexanedimethanol,
            (b) from 20 to 50 weight percent, based on the weight of the polyester, of a poly(alkylene oxide) glycol having 2, 3 or 4 carbon atoms in the repeating unit and having a molecular weight in the range of 600 to 4,000.

2. The process of claim 1 wherein the first polyester has an inherent viscosity of at least 0.7 and consists essentially of
    (1) a dicarboxylic acid component which is
        (a) from 85 to 70 mole percent 1,4-cyclohexanedicarboxylic acid having a trans isomer content of at least 90 percent, and
        (b) from 15 to 30 mole percent dimer acid, and
    (2) 1,4-cyclohexanedimethanol having a trans isomer content of at least 60 percent.

3. The process of claim 1 wherein the polyester is annealed at a temperature of at least 120° C. for a period of time of at least 15 minutes.

* * * * *